3,218,361
PROCESS FOR RECOVERING SPECIFIC ISOPULEGOLS
Robert L. Webb, Jacksonville, Fla., assignor to The Glidden Company, Cleveland, Ohio, a corporation of Ohio
No Drawing. Filed June 8, 1960, Ser. No. 34,638
6 Claims. (Cl. 260—631)

This invention relates to a process for the recovery of substantially pure l- or d-isopulegol, and especially for the recovery of such l-isopulegol and the preparation of l-menthol therefrom. l-Menthol is an especially valued organoleptic material useful in the drug, confectionery, and tobacco industries for its cooling sensation. d-Menthol, obtainable from d-isopulegol, has a minty flavor. More broadly my process can be utilized to replace at least in part resolution procedures for the production of virtually optically pure compounds.

Formerly it has been proposed to hydrogenate with hydrogen a mixture of isomeric isopulegols containing l-isopulegol and resulting from cyclization of citronellal, thereby forming a mixture of menthols, then to treat the mixed menthols for recovery of the desired l-menthol, e.g. by forming solid crystalline derivatives of the mixed menthols, separating the derivatives, and reconverting at least the separated derivative of l-menthol into l-menthol.

My process has the advantage of recovering directly a substantial amount of l- or d-isopulegol. The so-recovered isopulegol can be directly hydrogenated to form the corresponding menthol of high quality (e.g., l-menthol meeting the requirements of the U.S. Pharmacopeia—specific rotation between −45 and −51° and melting point of 41–43° C.—from my recovered l-isopulegol). My process has a further advantage of being amenable to cyclic procedures for repeated recovery of l- or d-isopulegol of high optical purity.

Heretofore it has not been known to crystallize l- or d-isopulegol. The essence of the process resides in my discovery that l- or d-isopulegol can be crystallized in virtually optically pure form from a mixture of isomeric isopulegols obtained from the cyclizing of an optically active citronellal. The remarkable thing about this process is that the crystallization of such pure l- or d-isopulegol from the mixture is very highly selective, particularly in view of the fact that the closely associated compounds, d- and l-menthol, do not separate cleanly upon recrystallization from analogous corresponding mixtures, e.g., d-l-menthol mixtures—apparently because mixed crystals of optically active and optically inactive materials are formed.

As the presently most commercially important aspect of my process concerns the separation of l-isopulegol obtained by cyclizing optically active d-citronellal for production of l-menthol, this specification shall be addressed principally thereto, but it should be understood that the techniques shown for recovery of l-isopulegol from cyclizing optically active d-citronellal can be applied also for recovery of d-isopulegol from cyclizing optically active l-citronellal.

My method for separating substantially optically pure l-isopulegol from a mixture of isomeric isopulegols contain l-isopulegol and obtained by cyclizing optically active d-citronellal comprises: cooling a fluent liquid composition consisting essentially of said mixture of isomeric isopulegols until a primary crystalline portion is formed, said portion being l-isopulegol solids to the virtual exclusion of any other crystalline material; and recovering said l-isopulegol solids from the resulting mother liquid enriched in other isopulegol isomers and reduced in l-isopulegol.

The fluent mixture can be a melt of the mixture of isomeric isopulegols; alternatively there can be added to the melt a homogeneous inert solvent such as mixed hexanes or petroleum ether, or the mixture of isomeric isopulegols can be dissolved in such solvent (advantageously a nonpolar one) preparatory to the crystallizing treatment. Preferably, for efficiency and economy in the practice of my invention I crystallize from a melt, but I can use as much as 40–60% of the solvent blended with the mixed isomeric isopulegols, if desired.

Separation of the crystalline l-isopulegol from the resulting mother liquid in my process can be done in conventional manner, e.g. by centrifuging, filtering, decanting, or the like. The raw crystals are advantageously rinsed free of adhering mother liquor with an inert solvent preparatory to hydrogenation of the crystals into l-menthol.

Heretofore only two of the theoretically possible isopulegols have been isolated, namely, l-isopulegol (corresponding to l-menthol and d-α-isopulegol (corresponding to d-neo-menthol. Actually there are four isomeric isopulegols corresponding to menthol, neo-menthol, iso-menthol, and neo-iso-menthol, respectively. I prefer to refer to a particular isopulegol isomer in the same terms as its specific menthol derivative. Thus, in this specification I shall refer to the precursor of l-menthol as l-isopulegol; to the precursor of d-neo-menthol as d-neo-isopulegol (instead of d-α-isopulegol); to the precursor of d-iso-menthol as d-iso-isopulegol; to the precursor of d-neo-iso-menthol as d-neo-iso-isopulegol, and so on.

When any of the foregoing isopulegols are referred to without optical sign, a mixture of d and l forms of the isomer is indicated. Without respect to optical rotation the several isopulegol isomers correlative with specific menthols can be illustrated as follows:

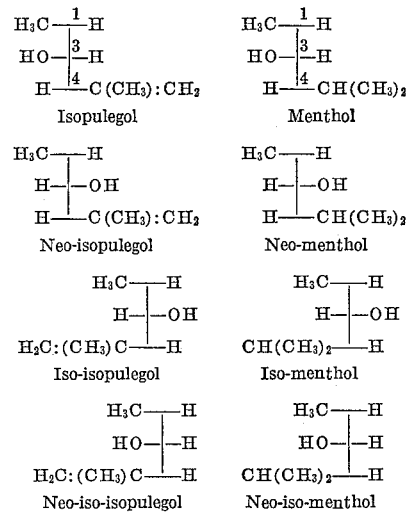

A mixture of stereo isomeric isopulegols can be made from the cyclization of d-citronellal by means of heating the citronellal, preferably with a catalyst such as copper or silica gel, as shown in U.S. Patent 2,117,414. Citronellal is obtainable from many sources such as the isolation of citronellal from natural citronella oil, from the dehydration of hydroxycitronellal, or from the treatment of the chlorhydrin of 2,6-dimethyl-7-octene-2-ol as taught in U.S. Patent 2,902,495. Suitable citronellol for conversion into citronellal and thence to a mixture of isopulegol isomers for practice of my invention also can be made according to the processes of U.S. patent applications S.N. 701,306, now U.S. Patent No. 2,961,452, and S.N. 805,363, now U.S. Patent No. 3,005,845.

The optical purity of ordinarily available d-citronellal, which is the basic material for cyclizing to form a mixture of stereo isomeric isopulegols for my purpose of making l-menthol, is somewhat variable from various sources and even from the same source. None of the commercial sources of citronellal furnish this compound in an optically pure state. Generally, its optical purity is between 70% and 80% and it can be even lower, e.g., 50–60%. The remainder of the citronellal is optically inactive. In other words, the aldehyde of optical purity of 80% is about 90% in the dextro form plus 10% laevo form. Isolation, then, of a pure, optically active l-isopulegol from a cyclization mixture of commercially available d-citronellal involves not only the selective separation of other stereo forms of optically active isopulegols from l-isopulegol, but also of optically inactive isopulegol isomers from the l-isopulegol.

The best yields of l-isopulegol are obtained when the starting d-citronellal is of the highest optical purity, and when the l-isopulegol is the predominant stereo isomer in the mixture of isomeric isopulegols submitted to crystallization. In one aspect of my process the cyclization products of d-citronellal are fractionally distilled to obtain a fraction enriched in l-isopulegol, and it is said fraction which is submitted to the crystallizing process. It is advantageous to submit to crystallization a fluent composition wherein the l-isopulegol fraction of the isomeric isopulegols is at least about 50% and preferably approaching 90% or even higher. To obtain an appreciable crystal crop in such operation, the temperature of the crystallization should be at least as low as about 0° C., advantageously at least as low as about minus 30° C., and it can reach even minus 75° C. or lower. The temperatures substantially below about minus 75° C. are less practical for economic reasons. Preferably, the crystallizing temperature is between about minus 10° and minus 75° when treating isopulegol mixtures obtained from the cyclization of ordinary commercial grades of d-citronellal.

If the mother liquor separated from the crystalline l-isopulegol solids is heated to 200–250° C. the isomeric isopulegols therein can be converted to an essentially equilibrium mixture from which additional l-isopulegol can be crystallized in the same manner. Using this procedure it is possible to convert eventually virtually all or at least a major portion of the optically pure isopulegol isomers (i.e., d-neo-isopulegol and d-iso-isopulegol) into l-isopulegol of high optical purity.

From cyclization mixtures of optically active d-citronellal I have been able to fractionally distill a mixture rich in d-iso-isopulegol; to purify this material by crystallization; and to recover a pure d-iso-isopulegol of congealing point 27.3° C. This material is readily hydrogenated to pure d-isomenthol. However, if d-iso-isopulegol is heated to a temperature above about 200° C. in an inert atmosphere, it will be converted into a mixture of the four isopulegol isomers in optically pure state, plus some d-citronellal. Said mixture of citronellal and isopulegol isomers can be crystallized according to the precepts of my process to isolate and recover l-isopulegol pure enough for hydrogenation into U.S.P. menthol. The mother liquors can be heat treated again in a similar manner to reestablish the equilibrium between the citronellal and the four isopulegol isomers, and this mixture can again be subjected to crystallization for the isolation of l-isopulegol. Repeated treatments therefore are capable of converting all of the d-citronellal and the undesired liquid stereo isomers of isopulegol into l-isopulegol.

An improvement consists in making a fractional distillation to remove the bulk of the citronellal and the polymeric residue of the heat treatment from the isopulegol equilibrium products prior to crystallization. The isopulegols may be fractionated like the menthols; the lowest boiling fraction is rich in neo-isopulegol, the middle fraction is rich in isopulegol, and the highest boiling fraction is rich in iso-isopulegol. Neo-iso-isopulegol boils between neo-isopulegol and isopulegol, but as it is present only to the extent of a very few percent it is not ordinarily recovered in appreciable concentration.

If desired, the mother liquor from crystallization can be subjected to vapor phase pyrolysis at a temperature above about 250° C. and generally about 400° C. to form citronellal. The citronellal thus formed can again be cyclized to produce a new cyclization product rich in isopulegol for subsequent crystallizing treatment.

From the foregoing and the following examples it should be noted that additional l-isopulegol can be obtained from the mother liquors of the previous l-isopulegol separation by heating the mother liquors in an autoclave for equilibration, and then submitting the thus-equilibrated isopulegol mixture to a second crystallizing treatment, even though the composition of the equilibrium mixture submitted to the second crystallization has only about the same proportion of isopulegol in it as did the original mother liquor.

The basis for this phenomenon appears to be that the mother liquor from the first crystallization is sufficiently rich in d-isopulegol that no more l-isopulegol will precipitate at a given operating temperature, e.g., minus 65° C. The accompanying isomers in the mother liquor, however, are fully as optically active as the d-citronellal used for cyclization. By virtue of the heat treatment of the mother liquor a fraction of the isomers of high optical activity is converted to l-isopulegol of high optical activity, and, concurrently, a fraction of the d-isopulegol is converted into stereoisomeric isopulegols. The net result is an increase in the l-isopulegol content of so-treated mother liquor relative to d-isopulegol.

When practicing my process in its idealized form for making l-menthol from d-citronellal, I choose to start with d-citronellal of the highest optical activity economically available; to cyclize this citronellal; to fractionally distill the cyclization product into a first distillate fraction rich in d-neo-isopulegol, a second distillate fraction rich in l-isopulegol, and a third distillate fraction rich in d-iso-isopulegol. The first and third fractions desirably are then heat treated to produce a new mixture of stereoisomers enriched in l-isopulegol. These heat-treated first and third fractions are subjected to fractional redistillation for concentration of isopulegol and subsequent crystallizing treatment of the isopulegol-enriched distillates thus recovered for isolation of l-isopulegol therefrom. Said second distillate fraction, rich in l-isopulegol, can be blended with isopulegol-enriched distillate obtained from the heat-treated first and/or third original distillate fractions for a combined crystallization treatment, or it can be sent to the crystallizing treatment by itself.

If said second distillate fraction (i.e., the l-isopulegol fraction) is substantially free of stereoisomers, then the mother liquor from its crystallization will be very rich in optically inactive isopulegol. Accordingly, further recycling and heat treatment of said mother liquor would be quite unproductive of obtaining additional quantities of high purity l-isopulegol after heat treatment and subsequent recrystallization. In such instance the preferred treatment is simply to hydrogenate the crystalline l-isopulegol recovered from the second distillate fraction crystallizing treatment and thereby convert it into high quality l-menthol, and to hydrogenate the mother liquors from such crystallization (rich in optically inactive isopulegol) into a mixture of l-menthol and racemic menthol for separation by conventional methods.

In a less complex procedure than the foregoing idealized one the fractional distillation of the citronellal cyclization products can be operated simply to collect a forecut enriched in uncyclized citronellal and d-neo-isopulegol, then to strip off the balance of the volatile distilland to rid it of polymer prior to crystallization. If desired, the forecut can be handled as outlined above.

Conversely, if the optical purity of the d-citronellal available is extremely high, say 95+%, and the cyclization thereof is optimum, i.e., almost complete and coincident with the production of little polymer, it can be economically advantageous to crystallize prior to any fractionation. The fractionation is useful to the degree it assists the crystallization of l-isopulegol by virtue of enriching the crystallization feed therein. Hence, in any practical process, i.e., one commencing with d-citronellal having less than 100% optical purity, fractionation is desirable at least at some recycle stage, and the need for fractionation increases as the optical purity of the citronellal decreases.

While throughout this specification and examples d-citronellal and its derivatives have been discussed, it is evident to one skilled in the art that l-citronellal can be processed in the same fashion if available to produce pure d-isopulegol suitable for conversion into d-menthol. Similarly, virtually optically pure l-citronellal can be made from partly optically active l-citronella raw material, using this adaptation of my process: cyclizing l-citronellal in the raw material into a material rich in d-isopulegol; crystallizing out and recovering virtually optically pure d-isopulegol from the cyclization product in accordance with the precepts of this invention; and pyrolizing the recovered d-isopulegol back to l-citronellal.

The following examples show ways in which my invention has been practiced but should not be construed as limiting the invention. All percentages are weight percentages.

*Example 1*

One thousand grams of d-citronellal (from Formosan citronella oil) was cyclized by stirring at 130° C. for four hours with 5% silica gel. This d-citronellal stock used actually was of about 80% optical purity. The cyclization product had the following approximate composition: 4% unchanged d-citronellal, 18% d-neo-isopulegol, 72% l-isopulegol, and 6–8% di-iso-isopulegol (each isomer indicated being of about 80% optical purity, that is, consisting of about 90% of the particular isomer indicated and 10% of material having the opposite optical sign).

A melt of the cyclization product was crystallized by holding it at minus 65° C. for 18 hours whereby a crystal crop formed. After centrifuging, the crystals obtained (365 grams) had the following physical properties showing them to be high purity l-isopulegol: Congealing point 13.3° C., $\alpha_D^{25}$(10 cm. tube) minus 19.8°, $N_D^{25}$ 1.4698, $D_4^{25}$ 0.905. Hydrogenation of this l-isopulegol at 25 to 30° C. using 1% Raney nickel catalyst at a hydrogen pressure of 40 to 60 p.s.i. gave l-menthol ($\alpha_D^{25}$(10 cm. tube) −48.70). The l-menthol product was analyzed by vapor phase chromatography; its purity was above 98%.

Vapor phase chromatographic analysis of the mother liquor obtained from the above crystallization (602 grams) showed that it contained 6% citronellal, 27 to 28% neo-isopulegol, 55 to 56% isopulegol, and 10 to 12% iso-isopulegol.

*Example 2*

Five hundred grams of the mother liquor obtained from Example 1 was heated for 3 hours in an autoclave at 240 to 250° C. in a nitrogen atmosphere, then fractionally distilled. Vapor phase chromatographic analysis of the fractions indicated that the reaction product had the following approximate composition: 9 to 10% citronellal, 18 to 20% neo-isopulegol, 56 to 57% isopulegol, 9 to 10% iso-isopulegol, and 3% polymeric materials. All the fractions except those rich in citronellal and polymer were combined to form a mixture of 453 grams of isomeric isopulegols having the following approximate composition: 5% citronellal, 22 to 23% neo-isopulegol, 57 to 58% isopulegol, 11 to 12% iso-isopulegol, and a trace of neo-iso-isopulegol. When this mixture was crystallized at minus 65° C. and the crystals separated by centrifuging, 57 grams of l-isopulegol was obtained (congealing point 13.4° C., $\alpha_D^{25}$(10 cm. tube) minus 19.6°, $N_D^{25}$ 1.4697, $D_4^{25}$ 0.904). Hydrogenation of this l-isopulegol using the same conditions as shown in Example 1 yielded a high quality l-menthol having an optical rotation of minus 48.2°.

*Example 3*

Two hundred grams of di-iso-isopulegol (congealing point 27.3° C., $\alpha_D^{25}$(10 cm. tube) plus 11.7°, $N_D^{25}$ 1.4775, $D_4^{25}$ 0.925) was heated at 240° to 250° C. in an autoclave under a nitrogen atmosphere for 4 hours. The reaction product was then fractionally distilled through an efficient column and the fractions analyzed by infrared spectroanalysis and vapor phase chromatography. These analyses indicated that the reaction product was about 10 to 12% d-citronellal, 16 to 18% d-neo-isopulegol, 54 to 55% l-isopulegol, 14 to 15% d-iso-isopulegol, and 5% polymeric materials. All the fractions except those rich in citronellal and polymer were combined to give 164 grams of mixed isomeric isopulegols having the following approximate composition: 6% d-citronellal, 15 to 16% d-neo-isopulegol, 62 to 63% l-isopulegol, and 15 to 16% d-iso-isopulegol. When this mixture was crystallized at minus 65° C., and the crystals separated by centrifuging, 39 grams of l-isopulegol was obtained (congealing point 13.5° C., $\alpha_D^{25}$(10 cm. tube) minus 19.5°, $N_D^{25}$ 1.4696, $D_4^{25}$ 0.903.) Hydrogenation of this l-isopulegol using the same conditions as shown in Example 1 yielded high quality l-menthol having a specific optical rotation of minus 48.6°.

*Example 4*

A total of 200 grams of mixed isomeric isopulegols (3 to 4% d-neo-isopulegol, 48 to 49% l-isopulegol, and 49 to 50% d-iso-isopulegol) was passed continuously through a ⅜ inch diameter by 30 inch long iron tube heated at 395 to 400° C. at a rate of 3 grams per minute. One hundred and ninety-six grams of pyrolysate was recovered. The pyrolysate was fractionally distilled through an efficient column and the resulting fractions analyzed by vapor phase chromatography and infrared spectroanalysis. These analyses indicated that the pyrolysate contained about 7 to 8% hydrocarbons, 38 to 40% citronellal, 2 to 3% neo-isopulegol, 29 to 30% isopulegol, 20 to 21% iso-isopulegol, and 3% polymeric materials. The citronellal fraction of the pyrolysate so obtained can be treated broadly in the manner of Example 1 for recovery of additional l-isopulegol.

I claim:

1. A method for separating substantially pure l-isopulegol from a mixture of isomeric isopulegols containing l-isopulegol and obtained by cyclizing optically active d-citronellal which comprises forming a fluent liquid composition consisting essentially of said mixture of isomeric isopulegols, cooling said composition until a primary crystalline portion is formed, said portion being l-isopulegol solids to the virtual exclusion of any other crystalline material, and separating said l-isopulegol solids from the resulting mother liquor enriched in other isopulegol isomers and reduced in l-isopulegol.

2. The process of claim 1 wherein the said composition contains from about 50% to about 90% l-isopulegol, and the crystallizing temperature employed is at least as low as about 0° C.

3. The process of claim 2 wherein the crystallizing temperature used is between about minus 10° and about minus 75° C.

4. The process of claim 1 wherein said resulting mother liquor is converted into an essentially equilibrium mixture of isomeric isopulegols by thermal isomerization by heating at a temperature of from about 200° C. to about 250° C., and at least a portion of the resulting thermally isomerized mother liquor is subject to the steps of claim 1 for recovery of additional l-isopulegol.

5. The process which consists essentially in subjecting an isomeric isopulegol selected from the class consisting of neo-isopulegol and iso-isopulegol and mixtures thereof to thermal isomerization by heating the same at a temperature of about 200° C. to about 250° C. for a time sufficient to produce a mixture of isomeric isopulegols in which isopulegol is the principal isomer.

6. A method for separating substantially pure optically active isopulegol from a mixture of isomeric isopulegols in which an optically active isopulegol selected from the class consisting of l-isopulegol and d-isopulegol is present in an amount in excess of about 62% by weight of the total isomeric isopulegols present in the mixture which comprises forming a fluent liquid composition of such a mixture of isomeric isopulegols, cooling said composition until a primary crystalline portion is formed, said portion being substantially optically pure isopulegol solids to the virtual exclusion of other isomeric isopulegols, and separating said optically active isopulegol solids from the resulting mother liquor.

References Cited by the Examiner

UNITED STATES PATENTS

| | | | |
|---|---|---|---|
| 2,117,414 | 5/1938 | Glass | 260—631.5 |
| 2,361,532 | 10/1944 | Cox | 260—631 |
| 2,366,749 | 1/1945 | Ofner et al. | 260—631 |

OTHER REFERENCES

Gilman: "Organic Chemistry," vol. 1, 2nd ed. (1953), J. Wiley & Sons, Inc., New York, page 241.

Simonsen et al.: "The Terpenes," vol. 1, 2nd ed. (1953), Cambridge University Press, pages 289–291.

LORRAINE A. WEINBERGER, *Primary Examiner.*

CHARLES B. PARKER, LEON ZITVER, *Examiners.*

UNITED STATES PATENT OFFICE
CERTIFICATE OF CORRECTION

Patent No. 3,218,361            November 16, 1965

Robert L. Webb

It is hereby certified that error appears in the above numbered patent requiring correction and that the said Letters Patent should read as corrected below.

Column 1, line 63, for "tain l-isopulegol" read -- taining l-isopulegol --; column 2, lines 19 and 20, after "-menthol", each occurrence, insert a closing parenthesis; column 3, line 35, for "75°" read -- 75° C. --; column 5, line 49, for "48.70" read -- 48.7° --; column 6, line 5, for "di-iso-isopulegol" read -- d-iso-isopulegol --.

Signed and sealed this 6th day of September 1966.

(SEAL)
Attest:

ERNEST W. SWIDER            EDWARD J. BRENNER
Attesting Officer            Commissioner of Patents